United States Patent [19]
Gautier et al.

[11] Patent Number: 5,249,651
[45] Date of Patent: Oct. 5, 1993

[54] PNEUMATIC BRAKE BOOSTER WITH IMPROVED RESPONSE TIME

[75] Inventors: Jean-Pierre Gautier; Ulysse Verbo, both of Aulnay-Sous-Bois; Miguel Perez, Argenteuil, all of France

[73] Assignee: Bendix Europe Services Techniques, Drancy, France

[21] Appl. No.: 878,269

[22] Filed: May 4, 1992

[30] Foreign Application Priority Data

May 14, 1991 [FR] France ............................. 91 05845

[51] Int. Cl.$^5$ ............................................. B60T 13/56
[52] U.S. Cl. ..................... 188/357; 91/376 R
[58] Field of Search ............... 303/4, 12, 114.3; 91/376 R, 369.1, 369.3, 369.4; 60/547.3; 188/356, 357

[56] References Cited

U.S. PATENT DOCUMENTS

| | | | |
|---|---|---|---|
| 3,017,866 | 1/1962 | Stelzer | 91/376 R |
| 3,082,744 | 3/1963 | Gardner | 91/376 R |
| 3,614,911 | 10/1971 | Belart | 91/376 R |
| 4,608,825 | 9/1986 | Fontaine | 60/545 |
| 4,649,802 | 3/1987 | Myers | 91/376 R |
| 4,763,561 | 8/1988 | Gautier | 91/376 R |

FOREIGN PATENT DOCUMENTS 2625156 6/1989 France .
2076488 12/1988 United Kingdom .

*Primary Examiner*—Matthew C. Graham
*Attorney, Agent, or Firm*—Larry J. Palguta; Ken C. Decker

[57] ABSTRACT

The invention relates to a pneumatic brake-booster comprising a casing (10), inside which is situated a piston (20) consisting of a rear tubular part (22) which supports a skirt (14) and which with the aid of an unwinding diaphragm (12) defines a front chamber (16) permanently connected to a vacuum source and a rear chamber (18) selectively connected to the front chamber (16) or to the atmosphere by a valve mechanism (20a,32a, 40) actuated by a control rod (34) adapted to bear, by way of a plunger (32), against one face of a reaction disk (58) fastened to a push rod (56), the valve mechanism (20a, 32a, 40) comprising a valve closure member (40) cooperating with a first valve seat (32a) formed on the plunger (32) and with a second valve seat (20a) formed on the piston (20). According to the invention, the plunger (32) and the piston (20) are provided with a second valve mechanism (65, 70).

4 Claims, 1 Drawing Sheet

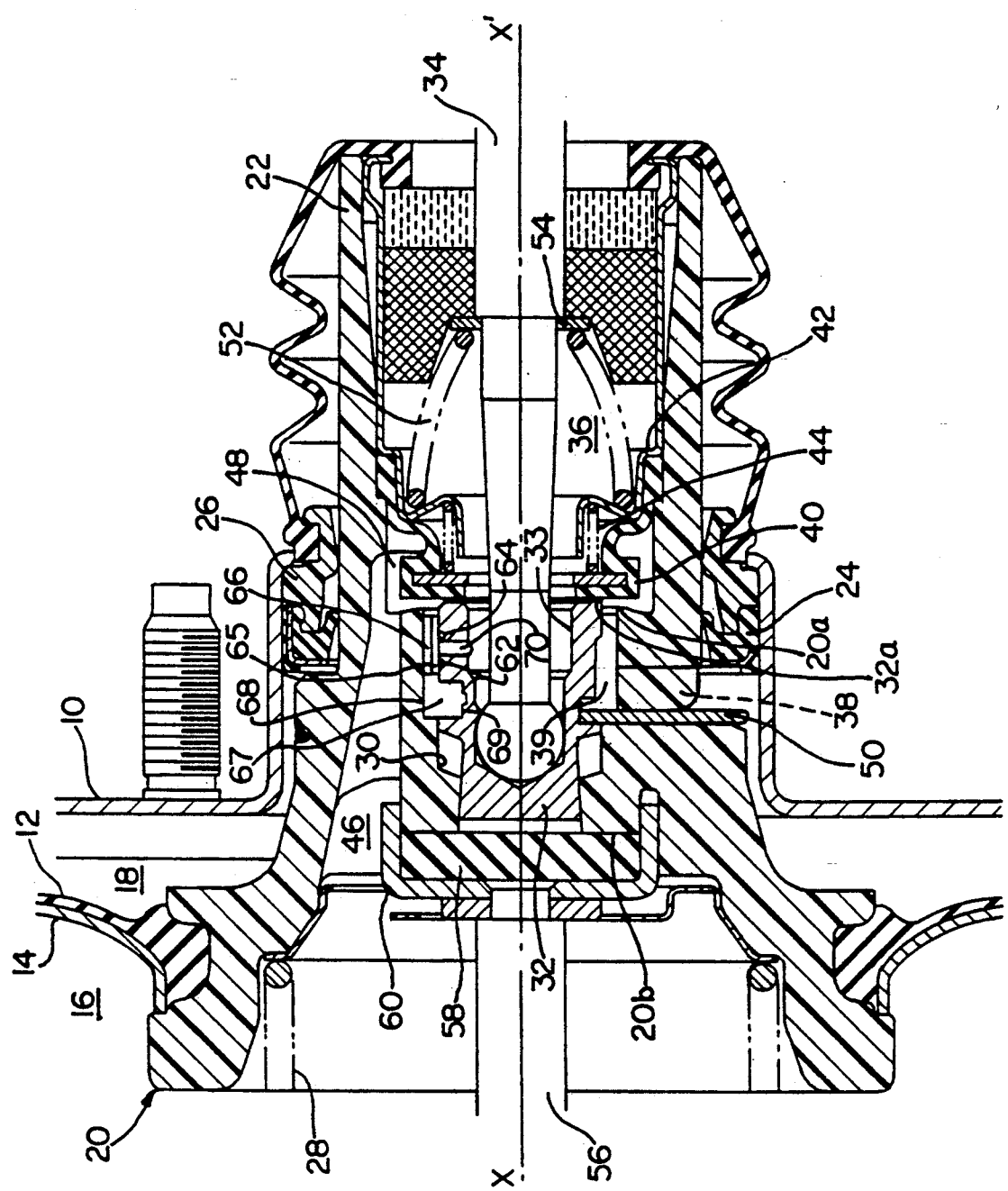

PNEUMATIC BRAKE BOOSTER WITH IMPROVED RESPONSE TIME

The present invention relates to pneumatic boosters, more particularly of the type used to provide braking assistance in motor vehicles.

BACKGROUND OF THE INVENTION

Conventionally, boosters of this type comprise a piston which consists of a rear tubular part and a skirt and which with the aid of a rolling diaphragm defines a front chamber permanently connected to a vacuum source and a rear chamber selectively connected to the front chamber or to the atmosphere by a valve means actuated by a control rod adapted to bear, by mean of a plunger, on one face of a reaction disk fastened to a push rod, the valve means comprising a valve closure member cooperating by an active part with a first valve seat formed on the plunger and with a second valve seat formed on the piston, the rear chamber being connected to the atmosphere via an annular space defined between the first and second valve seats when the plunger is driven into the piston.

Although their operation is satisfactory, boosters of this kind nevertheless have some disadvantages. Thus, during braking, the passage offered to atmospheric air towards the rear chamber is reduced, which slows down the movement of the air in the direction of the rear chamber and increases the response time of the booster. Various compromises have been proposed to make this response time acceptable for so-called "normal" braking when only the slowing down of the vehicle is desired. However, this response time is always much too long in the event of heavy braking for which rapid intervention of the desired.

SUMMARY OF THE INVENTION

The present invention consequently has the object of providing a booster whose response time is as short as possible in the event of heavy braking.

To this end, the booster of the invention is essentially characterized in that the plunger has at least one radial passage, each radial passage being, at rest and during normal braking action, sealingly closed by a portion of the piston and being, during heavy braking action, uncovered by this portion so as to bring the rear chamber into communication with the atmosphere, each radial passage and the corresponding piston portion contributing to the formation of a second valve means which is selectively operational in the event of heavy braking.

BRIEF DESCRIPTION OF THE DRAWING

The invention will now be described by way of example with reference to the accompanying drawings, in which:

The single figure is a side view in longitudinal section, showing the central part of a pneumatic brake-booster, the conventional construction of which is shown in the bottom half of the figure, while the construction according to the present invention is shown in the top half of the figure.

DESCRIPTION OF THE PREFERRED EMBODIMENT

The bottom half of the figure shows a part of a brake-booster intended to be installed in the usual way between the brake pedal of a vehicle and the master cylinder controlling the hydraulic brake circuit of said vehicle. By convention, the part of the booster turned towards the master cylinder will be called the front, and the part turned towards the brake pedal will be called the rear of the booster.

The booster comprises an outer shell-shaped casing 10 possessing symmetry of revolution about an axis X—X'. Only the rear central part of said casing 10 is shown in the figure.

An rolling flexible diaphragm 12 made of elastomer material, reinforced in its central part by a metal support disk or skirt 14, defines inside the space bounded by the casing 10 a front chamber 16 and a rear chamber 18. The outer peripheral edge (not shown) of said diaphragm 12 is sealingly fastened on said outer casing 10. The inner peripheral edge of said diaphragm terminates in a bead held sealingly in an annular groove formed in the outer peripheral surface of a hollow booster piston 20 disposed along the axis X—X' of the booster. Said hollow piston 20 is extended towards the rear in the form of a tubular portion 22 passing sealingly through the rear wall of said casing 10. Leaktightness at this point is achieved with the aid of a reinforced annular seal 24, which is fastened by a ring 26 in a tubular central part forming a rearward extension of the rear wall of said casing 10.

A compression spring 28 interposed between said piston 20 and the front wall (not shown) of said outer casing 10 normally holds said piston 20 and said skirt 14 in a rear position of rest, which is shown in the figure and in which said rear chamber 18 has its minimum volume and said front chamber 16 its maximum volume.

In its central part situated between said rear tubular portion 22 and the front portion in which said diaphragm 12 and said skirt 14 are fastened, said piston 20 has a bore 30 in which is slidingly received a plunger 32 likewise possessing symmetry of revolution about the axis X—X'. The front end of a booster control rod 34, likewise disposed along the axis X—X', is mounted ball-jointedly in a blind bore 33 formed at the rear of said plunger 32.

The rear end (not shown) of said rod 34, which projects outside said tubular portion 22 of said piston 20, is controlled directly by the brake pedal (not shown) of the vehicle.

The annular space 36 delimited between said control rod 34 and the tubular portion of said piston 20 leads out to the atmosphere at the rear of the booster, for example by way of an air filter. Towards the front, this same annular space can communicate with said rear chamber 18 through a radial passage 38 formed in the central part of the piston and through passages 39 provided between said plunger 32 and the bore 30 of said piston 20 when assistance means controlled by said plunger 32 are actuated.

In a conventional manner, said assistance means comprise a three-way valve consisting of an annular valve closure member 40 mounted in the tubular portion of the piston and two annular valve seats 20a and 32a formed respectively on the central portion of said piston 20 and on said plunger 32.

Said valve closure member 40 forms the front end, of smaller diameter, of a flexible elastomer sleeve whose rear end terminates in a bead mounted sealingly inside said tubular portion 22 of said piston 20. Said bead is held in place by a metal cup 42, against which bears a compression spring 44 urging said valve closure member 40 in the forward direction.

Said annular valve seat 32a is formed on the rear end face of said plunger 32. In comparable manner said annular valve seat 20a is formed on the rear end face of the central portion of said piston 20, around said seat 32a. Depending on the position of said plunger 32 inside said piston 20, this arrangement enables said valve closure member 40 always to bear sealingly against at least one of said valve seats 32a and 20a through the action of said spring 44.

A second passage 46 is formed in the central portion of said piston 20, approximately parallel to the axis X—X', of the latter, in order to bring said front chamber 16 of the booster into communication with an annular chamber 48 formed around said valve closure member 40, inside said tubular portion 22 of said piston 20. When said plunger 32 occupies its real position of rest which is shown in the figure, and in which said valve closure member 40 bears sealingly against said seat 2a of said plunger 32 and is at a distance from said seat 20a of said piston 20, said front chamber 16 and said rear chamber 18 of the booster are thus in communication with one another by way of said passage 46, said annular chamber 48 and said passage 38.

Likewise in a conventional manner, at least one stop member 50 mounted in the central portion of said piston 20 delimits the axial stroke of said plunger 32 inside the latter. Said plunger 32 is normally held in the rear position of rest, defined by said member 50, by means of a compression spring 52 interposed between said cup 42 and a washer 54, which in turn bears against a shoulder formed on said control rod 34.

In its central portion said piston 20 comprises an annular front face 20b, onto the center of which said bore 30 leads out. Said annular front face 20b of said piston 20 acts on a rear face of a push rod 56 through a reaction disk 58 made of a deformable material, such as an elastomer. More precisely, said push rod 56 and said reaction disk 58 are disposed along the axis X—X' of the booster, in line with said control rod 34 and said plunger 32. Said reaction disk 58 is capped by a hood 60 fastened to said push rod 56 and centered on the axis X—X' of the booster, said hood cooperating with an annular groove formed in the central portion of said piston 20, around the annular front face 20b of the latter.

The operation of this booster is conventional and may be briefly described as follows.

When the booster is installed in a vehicle, the front chamber 16 is in permanent communication with a vacuum source.

In a first stage the force applied by the driver to the brake pedal has the effect of equalling the prestress force of the spring 52 minus the prestress force of the spring 44. In the course of the following slight movement of the control rod 34 and the plunger 32 the valve closure member 40, acted on by said spring 44, follows the seat 32a of the plunger 32 until it comes into contact with the seat 20a of the piston; the front chamber 16 and rear chamber 18 of the booster are then isolated from one another.

In a second phase of the operation of the brake, said plunger 32 is moved sufficiently far forwards for said valve closure member 40 to be in sealing contact with said seat 20a of the piston and to start to move away from said seat 32a of the plunger. This being the case, said rear chamber 18 of the booster is isolated from said front chamber 16 and comes into communication with the atmosphere.

The rear chamber 18, which previously was in communication with said front chamber 16 and was therefore under reduced pressure, consequently draws in air at atmospheric pressure through the radial passage 38, the passages 39 provided between said plunger 32 and the bore 30 of the piston 20, and the valve passage of small section between said valve closure member 40 and said seat 32a of the plunger. There is thus considerable obstruction of the air passage because of the small size of the valve passage gap 32a-40, and therefore a long response time which, although scarcely felt in the case of braking when it is only desired to slow down the vehicle, may become prohibitive in the event of heavy braking.

It will therefore be understood that it is highly desirable to provide a booster in which, with a stroke of said control rod 34 corresponding to heavy braking, the section provided for the passage of air will be as large as possible in order that the response time may be as short as possible, without increasing the free stroke of the booster.

This object is achieved with the aid of the invention, of which one example of embodiment is illustrated in the top half of the figure.

In the top half of the figure it can be seen that the piston 20 and the plunger 32 have been modified for this purpose. According to the invention said plunger 32 slides sealingly in the bore 30 with the aid of two seals 62 and 64 disposed, for example, in the rear part of said plunger 32. In a portion 65 of the central part of said piston 20 in which said plunger is sealingly slidable, axial passages 66 are formed which bring the annular chamber 48 formed around the valve closure member 40 into communication with an annular space 67 formed between a groove 68 inside the bore 30 and a groove 69 formed in the periphery of said plunger 32 and facing said groove 68. The radial passage 38 to the rear chamber 18 leads into said annular space 67. Radial passages 70 are formed in said plunger 32 and lead on the one hand into the blind bore 33 of said plunger 32 and on the other hand onto the outer periphery of said plunger 32, between the two seals 62 and 64.

The operation of this booster can easily be deduced from the explanations given above. The first phase of actuation, in the course of which said front chamber 16 and rear chamber 18 are isolated from one another, is identical to that previously described.

In a second normal brake actuation phase, said rear chamber 18 of the booster is brought into communication with the atmosphere by way of the radial passage 38, the annular space 67, the axial passages 66, and the valve passage 32a-40. This results in unbalance of the pressures on the two faces of the piston skirt 14, thus giving rise to an assistance force transmitted by the piston 20 to the push rod 56. More exactly, this assistance force is exerted by the front annular face 20b of said piston 20 on the reaction disk 58. The latter transmits a part of the assistance force to said push rod 56 and uses another part of this force to become deformed towards the rear into the space formed between the bore 30 and the plunger 32. This deformation continues until the deformed part of said reaction disk 58 comes into contact with the front face of said plunger 32. In the course of this phase, which corresponds to what is called the jump of the booster, said piston 20 and said plunger 32 move forward together. At the end of this phase, a reaction starts to occur on said plunger 32 and said push rod 34, which causes said plunger 32 to move back relative to said piston 20, thus bringing about the closure of the valve passage 32a–40.

It is thus seen that for normal braking the booster of the invention behaves in a conventional manner.

On the other hand, in a phase of heavy brake actuation a sudden force is exerted on the control rod 34. This results in rapid forward movement of said plunger 32 in said bore 30. The first phase of isolation of the front and rear chambers takes place in a conventional manner. The valve passage 32a–40 then opens, allowing air at atmospheric pressure to penetrate into said rear chamber 18 via the passages 66, the annular space 67 and the passage 38. The pressure in the rear chamber therefore increases, thus producing an assistance force on the piston 20. Nevertheless, in view of the suddenness of the actuation, during the increase of pressure in the rear chamber and the increase of the assistance force, said plunger 32 continues to move forward in said piston 20 over a greater distance than it did during normal actuation. This has the consequence that the valve passage 32a–40 is open wider, that is to say it provides a larger passage section for the air than in normal braking, although this is still regarded as insufficient.

According to the invention, a second passage is provided for the air at atmospheric pressure to enable it to reach the rear chamber 18. Since in fact the plunger 32 has penetrated into the piston 20 to a greater extent than in normal braking, the seal 62 carried by said plunger 32, and situated the farthest forward, passes ahead of the portion 65 of said piston 20. Leaktightness of the radial passage 70 relative to the portion 65 is no longer achieved, and said passage 70 will then lead out into said annular space 67, the portion 65 of said piston 20 and said radial passage 70 acting as a slide valve. This means that, in this situation of heavy braking, the air at atmospheric pressure is admitted into the rear chamber of the booster by way of the valve passage 32a–40, the passages 66, the annular space 67, and the radial passage 38, as well as through the radial passages 70 of the plunger, the annular space 67 and the radial passage 38. It can thus be seen that in this case of extreme braking said radial passage 38 and said annular space 67 are connected to the atmosphere by two sources: the passages 66 and the passages 70. This obviously results in a greater influx of air to the rear chamber, consequently in a quicker increase in the assistance force, and therefore a reduction in the response time, which was of course the desired object.

During this phase of heavy brake application the reaction disk 58 was also stressed by the front face 20b of the piston. However, in the course of its rearward deformation it very quickly encountered the front face of the plunger, which had advanced sufficiently to uncover the radial passages 70.

The reaction of the push rod 56 was therefore very quickly transmitted to the control rod 34. When the driver has reached maximum braking force, or the desired force, which he will know by the "feel" of the brake pedal, he will maintain a constant braking force or will relax it, and this will be passed onto the control rod. The reaction disk 58 then tends to resume a position of equilibrium for the force demanded. Since the front annular face 20a of the piston 20 is still supplying the same force because the difference between the pressures on the two faces of the skirt 14 has not changed, said reaction disk 58 will tend to be further deformed in the rearward direction, thus pushing back the plunger 32 in relation to the piston 20. The passages 70 will then be closed again and the booster will return to normal operation.

The relative positions of rest of said plunger 32 and said piston 20 are defined by the stop member 50. It will therefore be possible to determine the distance between the axis of said passages 70 and the front edge of the portion 65 of said piston 20 at rest, so that said passages 70 will remain covered by said portion 65 during normal braking and will be uncovered during heavy braking. A distance of this kind will be variable in dependence on the features which it is desired to give to the booster thus equipped.

It is thus clearly seen that a booster has been produced whose operation is conventional for normal conditions of use and in which additional air passages are opened when heavy braking occurs, in order to shorten the response time of the booster under these extreme conditions.

The invention is obviously not restricted to the embodiment which has been described by way of example, but is capable of undergoing numerous modifications which will occur to those versed in the art. Thus, for example, the additional air passages could be formed on another part of the plunger and, if perfect sliding of the plunger in the piston can be achieved, the use of seals on the plunger on each side of the radial passages may be unnecessary. In addition, the invention can also be applied to boosters in tandem arrangement or to those having an additional assistance chamber. The response time of the booster could also be shortened for heavy braking by connecting the blind bore 33 of the plunger 32 to a source of air under a pressure higher than atmospheric. In this way, for normal braking when only the passage 32a–40-40 is open to the rear chamber, the latter is supplied with air at atmospheric pressure in a conventional manner. On the other hand, for heavy braking, the passages 70 are also open and the rear chamber will also be fed with air at a pressure higher than atmospheric, thus achieving quicker filling of said chamber and a correlative shortening of the response time. In this last-mentioned case it will be possible to provide a non-return valve preventing the passing of air coming from the passages 70 to the valve passage 32a–40.

We claim:

1. A pneumatic-brake-booster, comprising a casing inside which is situated a piston comprising a rear tubular part which supports a skirt and which with the aid of a diaphragm defines a front chamber connected permanently to a vacuum source and a rear chamber connected selectively to one of said front chamber and atmosphere by first valve means actuated by a control rod adapted to bear, by means of a plunger against one face of a reaction disk adjacent a push rod, said first valve means comprising a valve closure member cooperating with a first valve seat at said plunger and with a second valve seat at said piston, the rear chamber connected to the atmosphere via an annular space defined between said first and second valve seats when the plunger is displaced into the piston, characterized in that the plunger has at least one radial passage being, at rest and during normal braking, closed sealingly by a piston portion of the piston and being, during heavy braking uncovered by the piston portion to bring the rear chamber into communication with the atmosphere, the radial passage and piston portion forming second valve means separate from the first valve means and which is selectively operational during heavy braking.

2. The booster according to claim 1, characterized in that the radial passage communicates permanently with the atmosphere.

3. The booster according to claim 2, characterized in that axial passages are located in said piston portion of the piston.

4. The booster according to claim 3, characterized in that seals are disposed on an outer periphery of said plunger axially in front of and at the rear of said radial passage.

* * * * *